Figure 1:
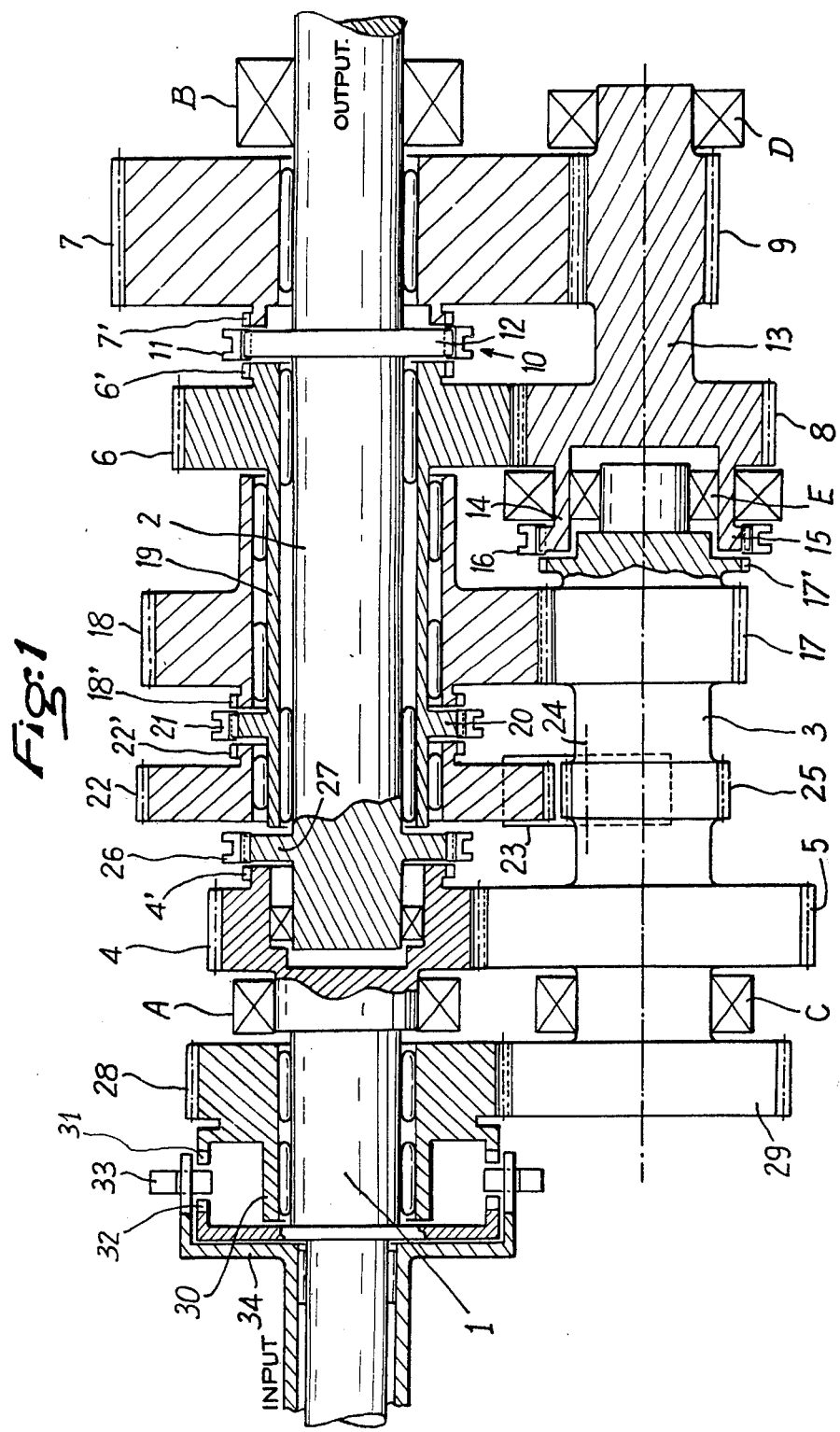

United States Patent [19]

Labat

[11] 4,136,575
[45] Jan. 30, 1979

[54] CHANGE-SPEED MECHANISM

[75] Inventor: Pierre Labat, Suresnes, France

[73] Assignee: Societe Anonyme de Vehicules Industriels et d'Equipements Mecaniques Saviem, Suresnes, France

[21] Appl. No.: 725,175

[22] Filed: Sep. 21, 1976

[30] Foreign Application Priority Data

Sep. 25, 1975 [FR] France .................. 75 29353

[51] Int. Cl.² ............................................. F16H 3/08
[52] U.S. Cl. ........................................ 74/359; 74/331; 74/360
[58] Field of Search ................ 74/331, 359, 360, 325, 74/329, 330, 356

[56] References Cited

U.S. PATENT DOCUMENTS

| 850,901 | 4/1907 | Bramley-Moore | 74/359 |
|---|---|---|---|
| 3,046,807 | 7/1962 | Barth et al. | 74/359 X |
| 3,817,123 | 6/1974 | Whateley et al. | 74/331 X |
| 3,859,870 | 1/1975 | Whateley | 74/360 X |

FOREIGN PATENT DOCUMENTS

| 1007185 | 4/1957 | Fed. Rep. of Germany | 74/359 |
|---|---|---|---|
| 1052199 | 3/1959 | Fed. Rep. of Germany | 74/330 |
| 18821 | 4/1914 | France | 74/330 |
| 467497 | 12/1951 | Italy | 74/359 |

*Primary Examiner*—Samuel Scott
*Assistant Examiner*—Carl F. Pietruszka
*Attorney, Agent, or Firm*—Fleit & Jacobson

[57] ABSTRACT

Change-speed transmission providing multiple forward speeds and at least one reverse speed. An output shaft of the transmission carries a first speed pinion or gear that is rigid with a hollow shaft that carries, in turn, a gear or pinion of the reverse gear train disposed upstream of other forward speed gears or pinions. The reverse gear carries a dog that is separated from a dog carried by the closest forward speed gear by a dog and synchromesh unit. A layshaft mechanism is positioned parallel to the output shaft to increase the number of gear ratios provided by the transmission.

4 Claims, 2 Drawing Figures

CHANGE-SPEED MECHANISM

This invention relates to a transmission mechanism providing five forward speeds and reverse, with four forward-speed gears, this mechanism comprising an input shaft and an output shaft aligned on a common axis, a layshaft parallel to said input and output shafts, the gear or pinion of one speed gear set rotating bodily with said layshaft and being in constant meshing engagement with an input gear or pinion rotatably rigid with said input shaft, three speed gears or pinions mounted for loose rotation on said output shaft and adapted to be rotatably connected to said output shaft by means of dog and synchromesh units, said three gears or pinions being furthermore in constant meshing engagement with speed gears or pinions carried by said layshaft and adapted to be rotatably connected therewith by means of dog and synchromesh units.

In a change-speed transmission already known through the French patent No. 1,485,749, the output gear providing the lowest (namely the first and second) ratios or speeds is rather bulky for it must transmit and withstand considerable torques. Therefore, the pinions transmitting the reverse ratio cannot utilize the component elements of the kinematic chain corresponding to said lowest transmission ratios if it is desired to maintain the overall dimensions of the gearbox within reasonable limits. To avoid this inconvenience, a known proposition consisted in disposing the reverse gear pinion in close vicinity of the input gear corresponding to the lowest or first speed. Now this arrangement corresponds to that of a conventional change-speed transmission wherein the number of transmission ratios corresponds to an equivalent number of trains of gears.

This invention is directed more particularly to a gear or pinion arrangement facilitating greatly the assembling of the gear corresponding to the reverse ratio while utilizing a number of gear trains or sets lower than the number of transmission ratios obtainable with the mechanism.

According to this invention, a first, free-rotating speed gear or pinion carried by the output shaft is rigid with a hollow shaft extending in the axial direction towards the input shaft, and a gear or pinion of a reverse gear train, mounted for free rotation on said hollow shaft, carries dogs separated from the dogs of another loosely mounted speed gear or pinion by a dog and synchromesh unit.

According to another feature characterising this invention, this second loose gear or pinion is carried by said hollow shaft.

Figure 2:
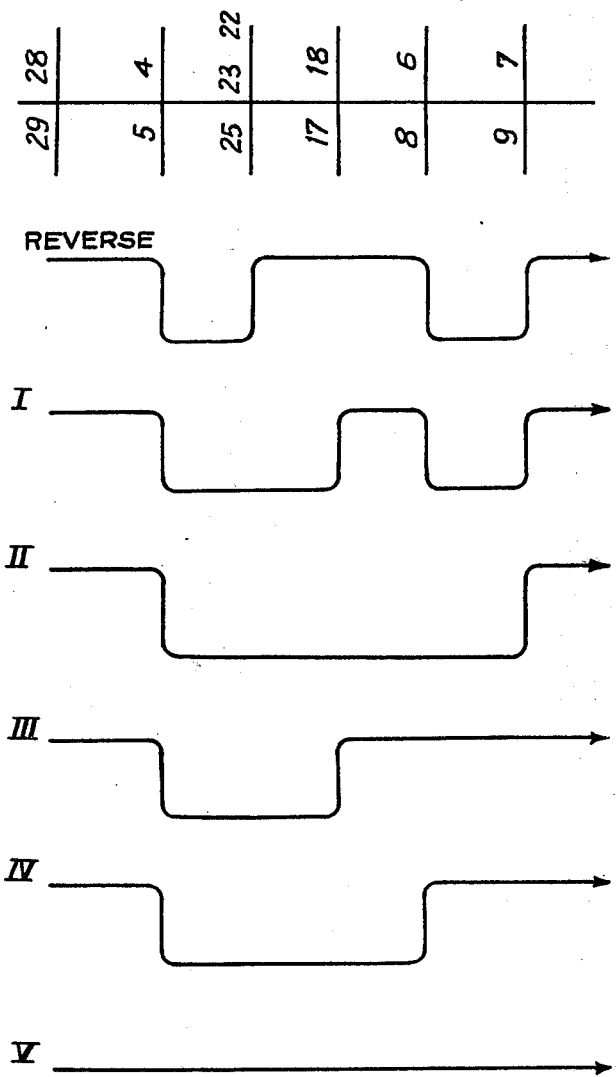

A typical form of embodiment of a change-speed transmission mechanism according to this invention will now be described by way of example with reference to the accompanying drawing, in which:

FIG. 1 is a diagrammatic illustration of a change-speed transmission mechanism according to this invention, which provides five forward speeds or gear ratios and a reverse ratio, and incorporates a speed-range doubling device on the input shaft, and FIG. 2 illustrates diagrammatically the kinematic chains corresponding to the various transmission ratios.

The change-speed transmission mechanism or gearbox illustrated in FIG. 1 comprises an input shaft 1 and an output shaft 2 aligned therewith, a layshaft 3 extending parallel to these shafts 1, 2, the bearing supporting these various shafts being designated diagrammatically by the reference letters A, B, C and D.

Rotatably rigid with the input shaft 1 and layshaft 3 are an input pinion 4 and a layshaft pinion 5, respectively, these pinions being in constant meshing engagement with each other. Mounted for loose rotation on the output shaft are a pair of speed pinions 6, 7, provided with dog teeth 6', 7', these pinions 6 and 7 being in constant meshing engagement with another pair of speed pinions 8 and 9 mounted for free rotation on the lay-shaft 3 with the interposition of a bearing E.

The pinions 6 and 7 provided with dog teeth 6' and 7' respectively are separated by a first dog and synchromesh unit 10 of which the sliding ring 11 is rotatably solid through its hub 12 with the output shaft 2. The dog teeth 6' and 7' selectively engageable by the sliding ring 11 enable the pinions 6 and 7 to be connected to the output shaft 2.

The pinions 8 and 9 are rigidly connected through a common shaft 13. Pinion 8 has an axial extension towards the input shaft 1 in the form of a hollow cylindrical portion 14 supporting the bearing E.

The end of hollow shaft 14 which extends beyond the bearing E constitutes the hub 15 of another sliding ring 16 selectively engageable with the dog teeth 17' of another pinion 17 rigidly connected to the layshaft 3. The dog teeth 17' enable the pinions 8 and 9 to be rotatably coupled with the layshaft 3.

Pinion 17 is in constant meshing engagement with the second free-rotating speed pinion 18 also mounted on output shaft 2 by means of a hollow shaft 19 surrounding said output shaft 2. This hollow shaft 19 is rigid with the first loose pinion 6 and carries the hub 20 of another sliding or striking ring 21 selectively engageable with the dog teeth 18' of pinion 18 and with the dog teeth 22' of pinion 22 of the reverse gear train. The dog teeth 18' and 22' permit of selectively coupling pinions 18 and 22 with hollow shaft 19, respectively. It may be noted that the sliding or striking ring 21 is an integral component element of the dog and synchromesh unit disposed between the dog teeth of pinion 22 and the dog teeth of the second loose pinion 18.

The reverse gear train further comprises a reversing idler or pinion 23 mounted for loose rotation on an auxiliary shaft 24 (shown only in the form of its center line) and a pinion 25 rotatably rigid with layshaft 3.

The input pinion 4 of speed gear set 4, 5 carries dog teeth 4'. A sliding ring 26 of a dog and synchromesh unit is slidably mounted on its hub 27 rigid with output shaft 2. The dog teeth 4' selectively engageable with the sliding ring 26 will thus permit of drivingly interconnecting input pinion 4 and output shaft 2.

The transmission mechanism illustrated further comprises a second input pinion 28 mounted for loose rotation on input shaft 1 and in constant meshing engagement with the pinion 29 rigid with layshaft 3. This second input pinion 28 comprises a hub 30 mounted for free rotation on input shaft 1.

The hub 30 and shaft 1 also carry dog teeth 31, 32 respectively which are selectively engageable by means of a coupling annulus 33 rotatably rigid with an input shaft 34 for the transmission mechanism. In the example illustrated, five transmission ratios can be obtained when the coupling ring 33 is engaged with dog teeth 32, plus the reverse transmission ratio.

The following Table illustrates the positions of the various dog sets and the torque transmission path (also shown in FIG. 2 of the drawing) for the various gear ratios.

| Gear ratio and speed | Dogs in engagement | Dogs free | Combinations of engaged pinions |
|---|---|---|---|
| I | 32-18'-7' | 31-22'-17'-6'-4' | (4-5) (18-17) (6-8) (7-9) |
| II | 32-17'-7' | 31-22'-18'-6'-4' | (4-5) (7-9) |
| III | 32-18'-6' | 31-22'-17'-7'-4' | (4-5) (18-17) |
| IV | 32-17'-6' | 31-22'-18'-7'-4' | (4-5) (6-8) |
| V | 32-4'-6' | 31-22'-18'-17'-7' | Direct drive |
| Reverse | 32-22'-7' | 31-18'-17'-6'-4' | (4-5) (25-23-22) (6-8) (7-9) |

From the above Table, it will be seen that the dog teeth 6'-7' are alternatively in engagement with sliding ring 11.

Five other transmission ratios may likewise be obtained when the coupling annulus 33 is brought to the position of engagement with dog teeth 31, i.e. so that the input of the transmission mechanism now passes through pinions 28, 29.

It may also be emphasized that an advantageous feature of the described form of embodiment lies in the fact that with the specific arrangement contemplated herein, which comprises four pinion-and-wheel sets (4–5), (18–17), (6–8) and (7–9) associated with intermediate dog and synchromesh units, it is possible to provide five gear ratios in lieu of four with the conventional gearbox arrangement, and that, in addition, the reverse transmission ratio is provided by a set of gears (22, 23, 25) disposed upstream of the three gear pinions mounted for free rotation on the output shaft.

The reverse gear path (4–5) (25-23-22) (6–8) (7–9) provide a relatively high gear ratio. Since pinions 25-23-22 are disposed upstream of gears (6–8) and (7–9), they transmit only a relatively low torque, so that the set of pinions 25-23-22 may be made lighter.

More generally, this invention is applicable as well to any change-speed mechanism providing n speeds and having n - 1 forward speed gears of which at least n - 3 gears may be disposed downstream of the reverse gear.

Thus, for instance, it is only necessary to add on the layshaft as many fixed pinions as there are additional gear ratios or speeds contemplated for a given transmission mechanism together with as many free-rotating pinions mounted on the hollow shaft 19 or on the output shaft. Corresponding dog devices are required of course for completing this assembly and connecting said pinions with the hollow shaft or the output shaft.

What is claimed as new is:

1. A change-speed transmission mechanism having (n) forward transmission ratios, one reverse transmission ratio, a reverse speed gear set and (n - 1) forward speed gear sets, comprising: an input shaft and an output shaft aligned on a common axis, layshaft means for carrying speed gears and having a layshaft, a common shaft, and a first dog and synchromesh unit for connecting the layshaft and the common shaft parallel to said input and output shafts, the layshaft having rigidly mounted thereon a gear of a speed gear set which is in constant meshing engagement with an input gear rotatably rigid with said input shaft, (n - 2) forward speed gears mounted for free rotation on said output shaft and adapted to be rotatably connected to said output shaft by means of second dog and synchromesh units, and in constant meshing engagement with speed gears carried by said layshaft means, one of said (n - 2) forward speed gears being rigid with a hollow shaft surrounding and extending in the axial direction towards said input shaft, a second of said (n - 2) forward speed gears being mounted for loose rotation and carried by said hollow shaft, a gear of a train of the reverse speed gear set being mounted for loose rotation on said hollow shaft and carrying dog teeth, and said second of said (n - 2) forward speed gears having dog teeth separated from the dog teeth carried by said gear of the reverse speed gear set by one of said second dog and synchromesh units.

2. A change-speed transmission mechanism providing four forward-speed gear sets for five forward gear ratios, said mechanism comprising an input shaft and an output shaft aligned on a common axis, layshaft means for carrying speed gears and including a layshaft, a common shaft, and a first dog and synchromesh unit for connecting the layshaft and the common shaft parallel to said input and output shafts, a gear of one speed gear set rotating bodily with said layshaft and being in constant meshing engagement with an input gear rotatably rigid with said input shaft, three speed gears mounted for loose rotation on said output shaft and adapted to be rotatably connected to said output shaft by means of second dog and synchromesh units, said three speed gears being furthermore in constant meshing engagement with other speed gears carried by said layshaft means, one of said three gears mounted on said output shaft being rigid with a hollow shaft surrounding the output shaft and extending in an axial direction towards said input shaft, a second of said three speed gears being mounted for loose rotation and carried by the hollow shaft surrounding the output shaft, a gear of a reverse gear train mounted for rotation on said hollow shaft and carrying dogs, and said second loosely mounted speed gear carrying dogs separated from dogs carried by said gear of the reverse gear train by one of said second dog and synchromesh units.

3. Change-speed transmission mechanism as set forth in claim 2, wherein said input shaft includes a set of dog teeth and wherein said mechanism further comprises a hub mounted for loose rotation on said input shaft and having a set of dog teeth, a second input gear associated with said hub, a gear rigid with said layshaft and in constant meshing engagement with said second input gear, and a coupling annulus adapted to be drivingly connected alternatively to one or the other set of dog teeth disposed on said hub and on said input shaft, respectively, in order to provide two ranges of speeds according to the momentary position of the coupling annulus in relation to said dog teeth.

4. A change speed transmission mechanism as set forth in claim 2, wherein another of said second dog and synchromesh units is positioned between dog teeth of said one of said three speed gears and dog teeth of a third of said three speed gears.

* * * * *